United States Patent [19]
Grant et al.

[11] Patent Number: 5,876,529
[45] Date of Patent: Mar. 2, 1999

[54] METHOD OF FORMING A PACK OF ORGANIC AND MINERAL FIBERS

[75] Inventors: Larry J. Grant, Westerville; Michael T. Pellegrin; Jay W. Hinze, both of Newark; Qingyu Zeng, Columbus, all of Ohio

[73] Assignee: Owens Corning Fiberglas Technology, Inc., Summit, Ill.

[21] Appl. No.: 977,361

[22] Filed: Nov. 24, 1997

[51] Int. Cl.$^6$ .................................................. C03B 37/04
[52] U.S. Cl. ........................... 156/62.4; 156/167; 264/6; 264/8; 264/121; 264/122
[58] Field of Search ................... 156/62.2, 62.4, 156/167; 264/6, 8, 122, 121

[56] References Cited

U.S. PATENT DOCUMENTS

| | | |
|---|---|---|
| 2,083,132 | 10/1937 | Williams et al. . |
| 2,931,422 | 4/1960 | Long . |
| 3,357,878 | 12/1967 | Newman . |
| 3,437,550 | 4/1969 | Paul, Jr. . |
| 3,958,385 | 5/1976 | Bondra, Jr. et al. . |
| 4,058,386 | 11/1977 | Faulkner et al. . |
| 4,568,581 | 2/1986 | Peoples, Jr. . |
| 4,670,034 | 6/1987 | Goodridge et al. . |
| 4,751,134 | 6/1988 | Chenoweth et al. . |
| 4,777,086 | 10/1988 | Madden et al. . |
| 4,888,235 | 12/1989 | Chenoweth et al. . |
| 4,917,715 | 4/1990 | Kaveh et al. . |
| 4,935,077 | 6/1990 | Ellers . |
| 4,987,664 | 1/1991 | McCullough, Jr. et al. . |
| 5,123,949 | 6/1992 | Thiessen . |
| 5,198,294 | 3/1993 | Masuda et al. . |
| 5,232,638 | 8/1993 | Thiessen et al. . |
| 5,236,754 | 8/1993 | McBride et al. . |
| 5,238,644 | 8/1993 | Boulanger et al. . |
| 5,242,633 | 9/1993 | Rook et al. . |
| 5,277,955 | 1/1994 | Schelhorn et al. . |
| 5,326,241 | 7/1994 | Rook et al. . |
| 5,362,539 | 11/1994 | Hall et al. . |
| 5,437,922 | 8/1995 | Jackson et al. . |
| 5,441,590 | 8/1995 | Ihm et al. . |
| 5,458,822 | 10/1995 | Bakhshi et al. . |
| 5,458,960 | 10/1995 | Nieminen et al. . |
| 5,480,466 | 1/1996 | Jackson et al. . |
| 5,490,961 | 2/1996 | Bakhshi et al. . |
| 5,501,872 | 3/1996 | Allen et al. . |
| 5,523,031 | 6/1996 | Ault et al. . |
| 5,523,032 | 6/1996 | Ault et al. . |
| 5,545,279 | 8/1996 | Hall et al. . |
| 5,595,584 | 1/1997 | Loftus et al. . |
| 5,614,132 | 3/1997 | Bakhshi et al. . |
| 5,642,601 | 7/1997 | Thompson, Jr. et al. . |
| 5,679,126 | 10/1997 | Loftus et al. . |

FOREIGN PATENT DOCUMENTS

| | | |
|---|---|---|
| 0303537 | 2/1989 | European Pat. Off. . |
| 91656 | 12/1978 | Japan . |
| 95/30787 | 11/1995 | WIPO . |

*Primary Examiner*—Michael W. Ball
*Assistant Examiner*—Sam Chuan Yao
*Attorney, Agent, or Firm*—C. Michael Gegenheimer; Curtis B. Brueske

[57] ABSTRACT

A method of forming an integrated pack of organic and mineral fibers includes centrifuging mineral fibers from molten mineral material using a mineral fiber spinner, directing the mineral fibers into a downwardly moving veil, generating an array of aligned organic fibers from a die and directing the organic fibers into contact with the mineral fibers to integrate the organic fibers with the mineral fibers, and collecting the integrated mineral fibers and organic fibers as a fibrous pack.

20 Claims, 7 Drawing Sheets

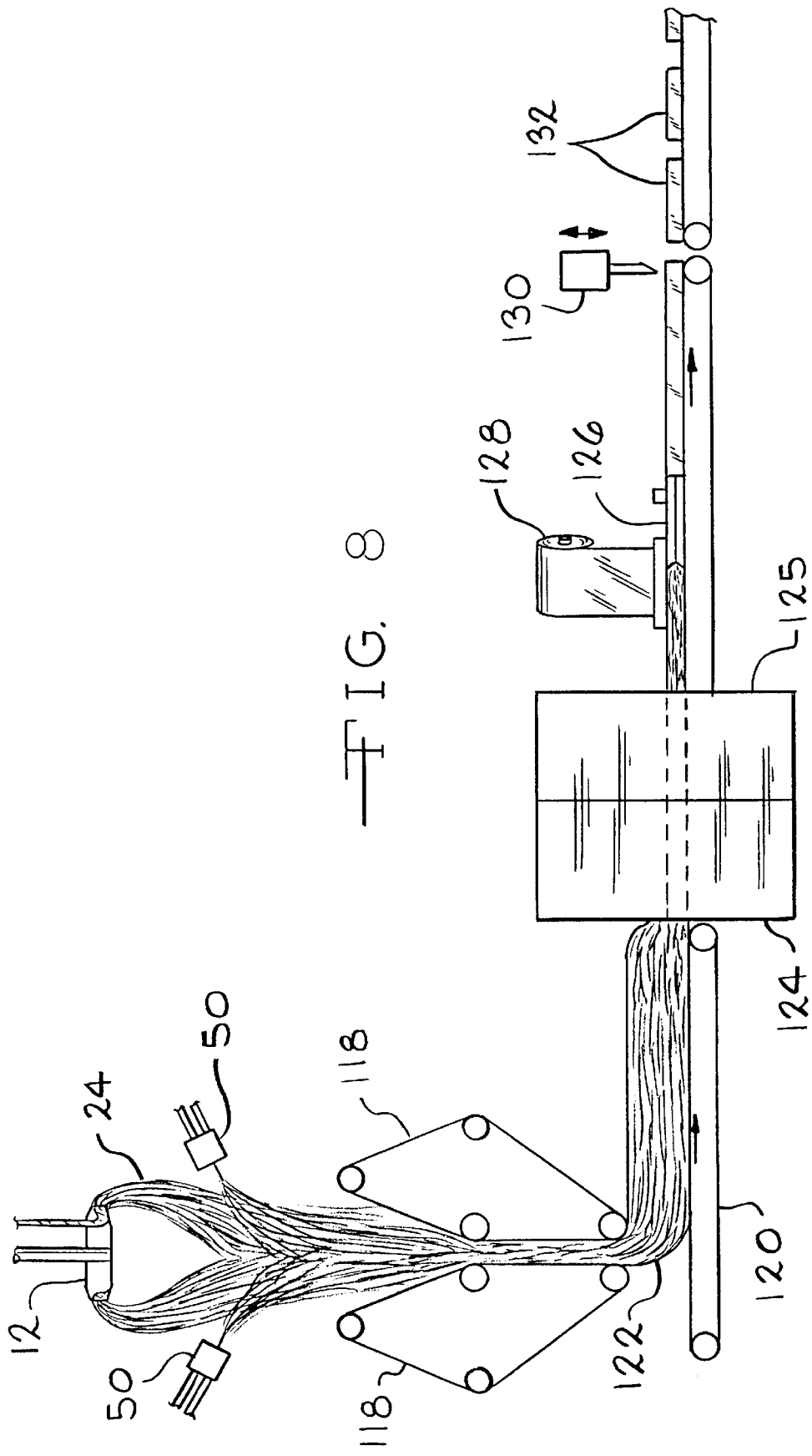

METHOD OF FORMING A PACK OF ORGANIC AND MINERAL FIBERS

CROSS-REFERENCE TO RELATED APPLICATIONS

The present invention is related to the inventions of the following U.S. patent applications: Ser. No. 08/976,671, entitled FIBROUS INSULATION HAVING INTEGRATED MINERAL FIBERS AND ORGANIC FIBERS, AND BUILDING STRUCTURES INSULATED WITH SUCH FIBROUS INSULATION, filed Nov. 24, 1998, and hereby incorporated by reference; Ser. No. 08/976,668, entitled METHOD AND APPARATUS FOR INTEGRATING ORGANIC FIBERS WITH MINERAL FIBERS, filed Nov. 24, 1998, and hereby incorporated by reference; and Ser. No. 08/977,405, entitled METHOD OF MAKING A FIBROUS PACK, filed Nov. 24, 1998, and hereby incorporated by reference.

TECHNICAL FIELD AND INDUSTRIAL APPLICABILITY OF THE INVENTION

This invention relates to the manufacture of fibrous products for such uses as thermal and acoustical insulation and as structural molding media. More particularly, this invention relates to processes for manufacturing fibrous products having both mineral fibers and organic fibers, such as polymer fibers, with the different fibers being integrated with each other for beneficial product properties.

BACKGROUND OF THE INVENTION

Mineral fiber products, particularly products made of glass fibers, are typically made as either continuous fibers or discontinuous fibers. Various organic coatings can be applied to these fibers for protecting the fibers from abrasion, for connecting the mineral fibers to each other to form a structural product, and for providing compatibility of the mineral fibers with other materials, such as the compatibility between the reinforcement fiber and a plastic matrix. In the case of insulation products, the mineral fibers are usually bonded together by organic material, such as a phenol/formaldehyde binder, to form a spring-like matrix which can recover after compression during packaging. One mat product having both glass fibers and fibers of organic material, and manufactured by a textile non-woven process, is disclosed in U.S. Pat. No. 4,751,134 to Chenoweth et al.

The application of organic material to the mineral fibers can take several forms. Continuous mineral fibers can be run through a bath or across a coater to apply a coating to the fibers, such as during the application of a size to continuous fibers. Alternatively, the organic material can be sprayed onto the mineral fibers. This method is commonly used in the manufacture of insulation products with a rotary process where a cylindrical veil of mineral fibers is met with the sprays of the phenol/formaldehyde binder.

One of the problems with applying aqueous organic binders of the prior art to cylindrical veils of mineral fibers is that a portion of the binder tends to evaporate prior to contact between the liquid binder drop and a mineral fiber in the veil. This problem is exacerbated by the need to apply the binder relatively close to the fiberizer, i.e., where the hot environment is particularly likely to cause some of the liquid binder droplets to evaporate before contacting a glass fiber. The evaporated binder material becomes a contaminant in the exhaust air stream of the process and must be cleaned up in order to avoid pollution problems. Also, the binder material on the mineral fibers tends to be sticky, requiring extensive cleaning of the fiber collection apparatus to prevent the build-up of clumps of glass fiber insulation material which can drop into the product and cause a product defect. Further, the binder material must be cured in an oven, requiring tremendous energy not only for curing the binder itself, but also for driving off the water associated with the binder, and for environmentally cleaning the gaseous by-products of the heating and curing process.

Attempts have been made in the past to integrate organic binder materials with mineral fibers from a rotary process without merely spraying the veil of fibers with an aqueous solution of the binder material. For example, U.S. Pat. No. 5,123,949 to Thiessen discloses a rotary fiberizing process where additive particles are supplied through the hollow quill or axle of the rotating spinner. The particles are directed toward the veil of mineral fibers from a locus within the veil. The additive particles can be fibrous in nature, such as cellulose fibers, and also can be resinous material in a particulate form.

Another approach in integrating organic material with rotary mineral fibers is disclosed in U.S. Pat. No. 5,614,132 to Bakhshi et al. A glass rotary fiberizer is operated to produce a downwardly moving hollow veil of glass fibers, and a polymer fiberizer is operated within the hollow veil to produce polymer fibers within the veil but directed radially outwardly toward the glass fibers. The polymer fibers commingle with the glass fibers, producing a reinforced resinous product having both glass fibers and polymer fibers. When the process of this patent was operated experimentally to make a glass mat reinforced plastic material, the polymer fibers experienced considerable heat from the hot fiber forming environment, with a typical result being that most of the polymer fibers melted and ended up as non fibrous particles on the glass fibers or on the polymer fibers. See, for example, Column 4, line 66 to Column 5, line 2. This was satisfactory for commingling glass fibers and polymer material into a molding material (a glass mat thermoplastic material) suitable for molding into a dense reinforced plastic product. Due to the nature of the compression of the product in a molding process, there was no need to provide a more substantial retention of polymer in fibrous form with the glass fibers. However, it is believed that the thermal resistance of insulation products would benefit from having a majority or more preferably a substantial amount of the polymer material in fibrous form.

As an alternative to the coaxial rotary commingling process, U.S. Pat. No. 5,595,584 to Loftus et al. discloses an alternate commingling process where glass rotary fiberizers centrifuging glass fibers, and polymer rotary fiberizers centrifuging polymer fibers, are positioned alternately with each other arranged along a collection surface. The polymer fiberizer can be oriented at an angle to the vertical so that the flow of polymer fibers is directed at an angle into contact with the veil of glass fibers. While the purpose of the alternate commingling process was to decouple the polymer fiber forming environment from the glass fiber forming region, it was perceived to be quite difficult to uniformly integrate the rotary-formed polymer fibers into the veil of glass fibers. The nonuniformities of the rotary polymer process combined with the swirling, chaotic environment of the glass fiber forming region would prohibit significant penetration of the polymer fibers into the glass fibers, potentially resulting in an unpredictable, laminar product having less than desired properties for some products.

It would be advantageous if there was developed an improved process for integrating polymer or other organic fibers into a flowing stream of glass fibers to produce a generally uniform mix of glass fibers and polymer fibers, preferably uniform by fiber distribution and uniform by weight. Such a process should provide protection for the polymer material supplied in fibrous form so that the fibers are not subjected to a hot environment which could undesirably vaporize the polymer material or otherwise degrade the polymer material, or which could soften or melt the polymer fibers into non-fibrous particles.

SUMMARY OF THE INVENTION

The above objects as well as other objects not specifically enumerated are achieved by a method of forming a pack of integrated organic and mineral fibers, which includes centrifuging mineral fibers from molten mineral material using a mineral fiber spinner, directing the mineral fibers into a downwardly moving veil, generating an array of aligned organic fibers from a die and directing the organic fibers into contact with the mineral fibers to integrate the organic fibers with the mineral fibers, and collecting the integrated mineral fibers and organic fibers as a fibrous pack.

In one embodiment of the invention, the method of forming an integrated pack of organic and mineral fibers includes centrifuging mineral fibers from molten mineral material using a mineral fiber spinner, directing the mineral fibers into a downwardly moving veil by means of an annular blower, wherein the veil of mineral fibers has an initial diameter at an initial locus at about the height of the blower, and a converged diameter narrower than the initial diameter at a converged locus beneath the initial locus, generating an array of aligned organic fibers and directing the organic fibers into contact with the mineral fibers to integrate the organic fibers with the mineral fibers by disbursing molten organic material through the orifices of an orificed die and attenuating the organic material with gaseous flows moving away from the die, wherein the organic fibers are directed into the veil so that a substantial portion of the organic fibers intersect the veil at a locus which is at the converged locus or beneath and within 50 cm of the converged locus, and collecting the integrated mineral fibers and organic fibers as a fibrous pack.

BRIEF DESCRIPTION OF THE DRAWINGS

FIG. 8 is a schematic view in elevation of direct formed apparatus for carrying out the method of the invention, illustrating a product shaping oven and encapsulation equipment.

DETAILED DESCRIPTION OF THE INVENTION

This invention will be described using glass fibers as an example of the mineral fibers of the invention. It is to be understood that the invention can be practiced using mineral fibers of other heat-softenable mineral material, such as rock, slag and basalt. Also, although the invention will be described using polymer fibers as the fibers to be directed into contact with the glass fibers, it is to be understood that fibers of any organic material, such as asphalt material, can be used with the invention, as long as the fibers are long or substantially continuous fibers suitable for enhancing the product properties.

Figure 1:
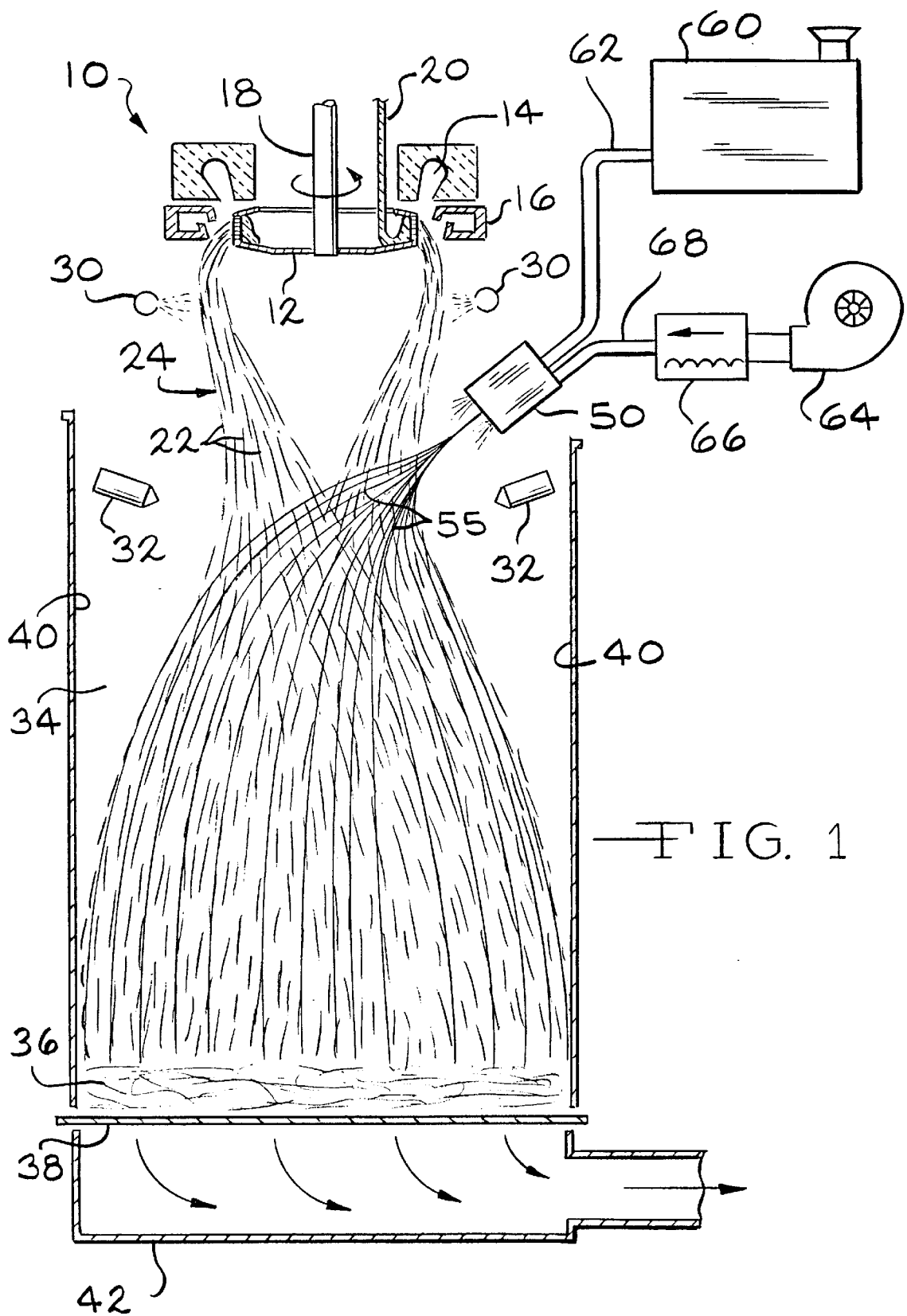
FIG. 1 is a schematic view in elevation of apparatus for integrating polymer fibers with glass fibers according to the method of the invention.

As shown in FIG. 1, the fiberizing apparatus, indicated generally at 10, includes a spinner 12, an annular burner 14 and an annular blower 16. The spinner is rotated on an axle or quill 18. A stream 20 of molten glass is delivered from a glass melting furnace, not shown, and the molten stream 20 drops into the interior of the rotating spinner 12. The centrifugal forces of the rotating spinner force the molten glass to emanate from the spinner in the form of fine glass streams that are turned downwardly as glass fibers 22 by the action of the blower 16 and gases induced by the blower. The blower gases and induced air attenuate the glass fibers into their final fine diameter, typically within the range of from about 3 to about 8 microns. The burner 14 is typically gas fired and supplies heat to the spinner and the fiber forming environment.

The glass fibers travel in a downwardly moving veil 24, which is generally cylindrical in shape, and which contains not only the glass fibers, but also rapidly moving air and gases of combustion from the burner 14. The veil 24 initially has a diameter slightly larger than the diameter of the spinner. The size or diameter of the veil, and the rotational speed of the gases and fibers within the veil, change as the veil moves downwardly. These changes are due to dissipation of the original energy of the gases within the veil, and on external forces influencing the veil.

Nozzles 30 can optionally be positioned to direct liquid sprays into the veil. Such sprays could include water or other evaporative liquid to cool the fibers and associated gases within the veil. The nozzles could also spray a lubricant onto the fibers to reduce fiber-to-fiber friction in the ultimate insulation product, which could thereby prevent fiber damage. If desired, the nozzles 30 could also be used to add an optional resinous binder to the glass fibers, although the method of the invention should result in a product having integrity and recovery properties good enough that a binder is not needed. Resinous binders, such as a urea phenol formaldehyde, are well known in the art. The nozzles are supplied with the desired liquid by means not shown.

Another device for affecting the veil 24 is a set of air lappers 32 that are positioned on either side of the veil 24. The air lappers discharge air to sweep or direct the veil from side to side of the forming hood 34 so that the pack 36 collected on the moving collection surface or forming chain 38 will have an even distribution across the width of the forming chain, from one hood wall 40 to the other. The forming chain 38 is mounted for movement as a conveyor, and is foraminous so that a suction box 42, positioned beneath the forming chain, can evacuate gasses from the hood 34 and pack 36.

Positioned on at least one side of the veil 24 is a polymer fiber generation device, preferably a polymer fiber die 50. The polymer fiber die produces an array 52 of polymer fibers 55, and directs them into contact with the glass fibers 22 to integrate the polymer fibers 55 with the glass fibers. The velocity of the polymer fibers in the array, in the direction away from the die, is at least 50 meters/second at a distance of 20 cm downstream from the die, and preferably is at least 100 meters/second. The intermingled polymer fibers 55 and glass fibers 22 are collected together in the form of the insulation pack 36. The polymer fiber die 50 can be any device suitable for forming fibers of polymer material or other organic material capable of forming fibers. A suitable polymer die 50 is a melt blowing die capable of producing generally continuous polymer fibers having an average diameter greater than about 4 microns, and preferably within the range of from about 4 to about 25 microns, and most preferably about 6 microns. Suitable polymer dies are available from J&M Laboratories, Inc., Dawsonville, Ga., and from Biax FiberFilm Corporation, Neenah, Wis. The polymer die 50 will preferably be selected to be able to provide a polymer content, by weight, within the range of from about 1 to about 10 percent of the expected total throughput of the glass fibers and polymer fibers. For example, if the glass fiber throughput is 1000 pounds per hour (454 kg/hr) and the desired loss on ignition (LOI) of polymer fibers is 2.5 percent, then the polymer die would be configured to have a throughput of about 25.6 pounds per hour (11.7 kg/hr). The LOI is the percentage of the total material that is organic and will burn off when heated.

The polymer fibers 55 can be made of any polymeric material from which fibers of suitable length, strength, durability and insulation characteristics can be formed. It is well known in the melt blowing industry that the fibers from a melt blowing polymer die are produced in substantially continuous lengths. Suitable polymer materials for making the polymer fibers are polyethylene terephthalate (PET) and polypropylene. Other polymer materials potentially useful for making fibers include polyphenylene sulfide (PPS), nylon, polycarbonate, polystyrene and polyamide. Even though the invention is described using polymer fibers 55 as an example, it is to be understood that other materials, including resins, asphalts, and other thermoplastic and thermoset materials, potentially can be used with the present invention.

Although a wide variety of thermoplastic compositions can be utilized in the process of the invention, polyolefin fibers such as polypropylene have been found to be particularly well suited for inclusion as binder fibers in mineral fiber insulation products. For improved adhesion of the polypropylene fibers to the mineral fibers, preferably at least a portion of the polypropylene fibers are formed from polypropylene that has been modified to introduce polar groups, as, for example, by free-radical induced grafting of ethylinically unsaturated monomers such as maleic anhydride, acrylic or methacrylic acid or esters thereof. Preferably, the polar monomer is maleic anhydride and is present at a level of from about 0.1% to about 10% by weight, more preferably, from about 0.3% to about 1.0% by weight of the modified polypropylene composition.

However, while such modified polypropylene fibers exhibit better adhesion to mineral fibers, it is generally not economically feasible in insulation products for all of the thermoplastic binder fibers to be formed of modified polypropylene. Accordingly, in such products, it is generally preferred that only from about 5% to about 30%, more preferably from about 10% to about 20%, of the thermoplastic binder fibers included in the fibrous composite are formed of modified polypropylene. These may be individual, discreet fibers formed separately from the unmodified polypropylene fibers, such as by separately melt blowing polypropylene fibers and modified polypropylene fibers and combining them with glass fibers to form the composite mat, or they may be composite fibers formed by melt blowing a mixture of polypropylene and modified polypropylene.

Associated with the polymer fiber die 50 is a an extruder 60 that supplies polymer material to the polymer fiber die 50 via a polymer line 62. The extruder can be any suitable extruder for heating and pressurizing the organic material and supplying it in a fiberizable form. Suitable extruders are available from the above-mentioned polymer die suppliers.

Figure 3:
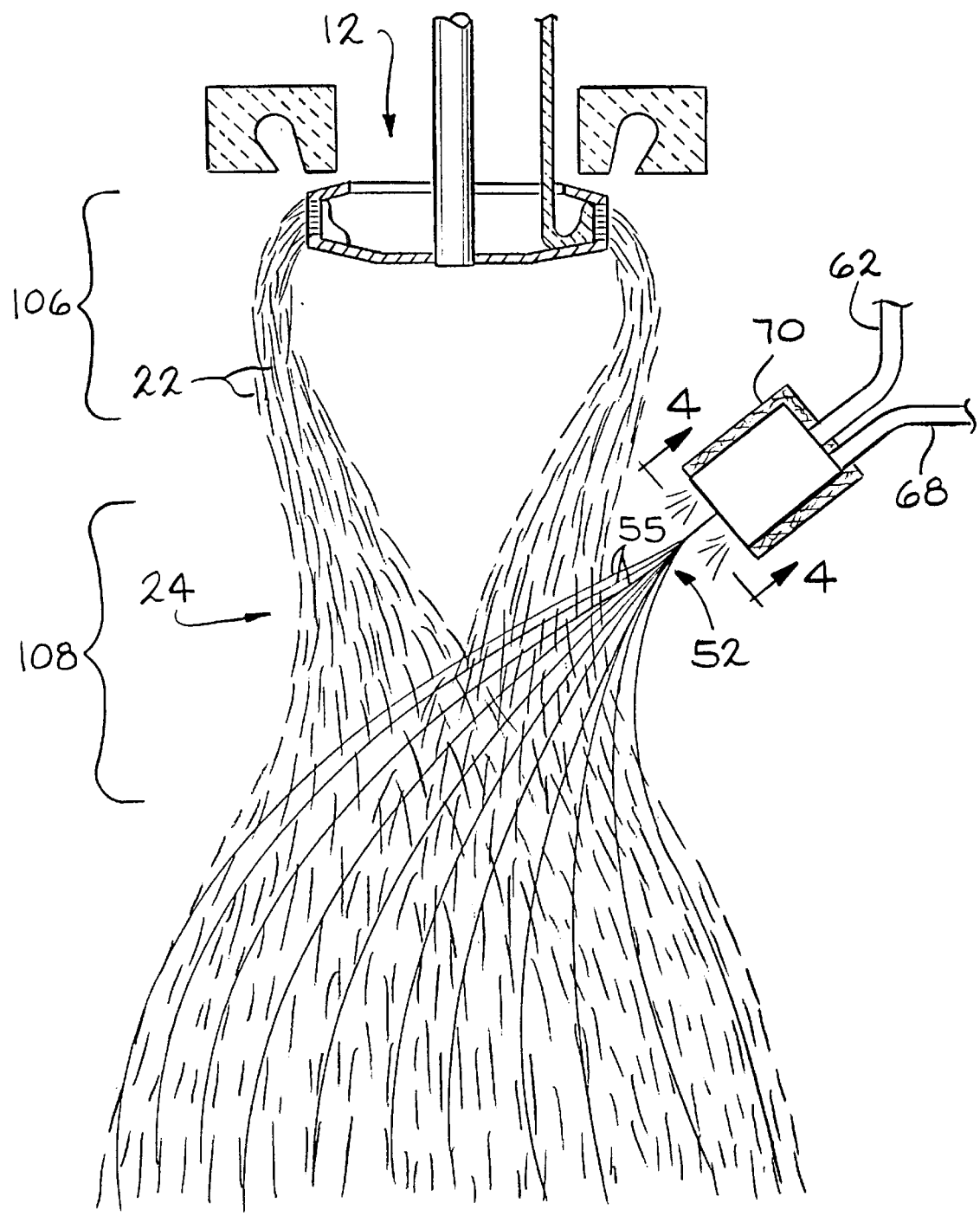
FIG. 3 is a schematic view in elevation illustrating in greater detail the integration of the polymer fibers with the glass fibers shown in FIG. 1.

Also associated with the polymer fiber die 50 is a polymer blower 64 which supplies hot pressurized air to the polymer fiber die for attenuation of the polymer fibers 55. The volume of air required is a function of the desired fiber diameter and the amount of polymer material being fiberized, as well as other factors. The air is heated with the heater 66, which is preferably an electric heater, and the heated air is supplied to the polymer die 50 via hot air line 68. The hot air exits the polymer fiber die 50 to help attenuate the polymer fibers and maintain them in a soft attenuable condition as long as is necessary for satisfactory reduction in diameter. As with the polymer fiber die 50, the polymer extruder 60, blower 64 and heater 66 are commercially available. Since the polymer fiber die 50 is positioned in a hot environment, i.e., generally below the fiberizer 10, the polymer fiber die is preferably provided with insulation material 70 to prevent the polymer material from excessive heat loss, as shown in FIG. 3.

Figure 2:
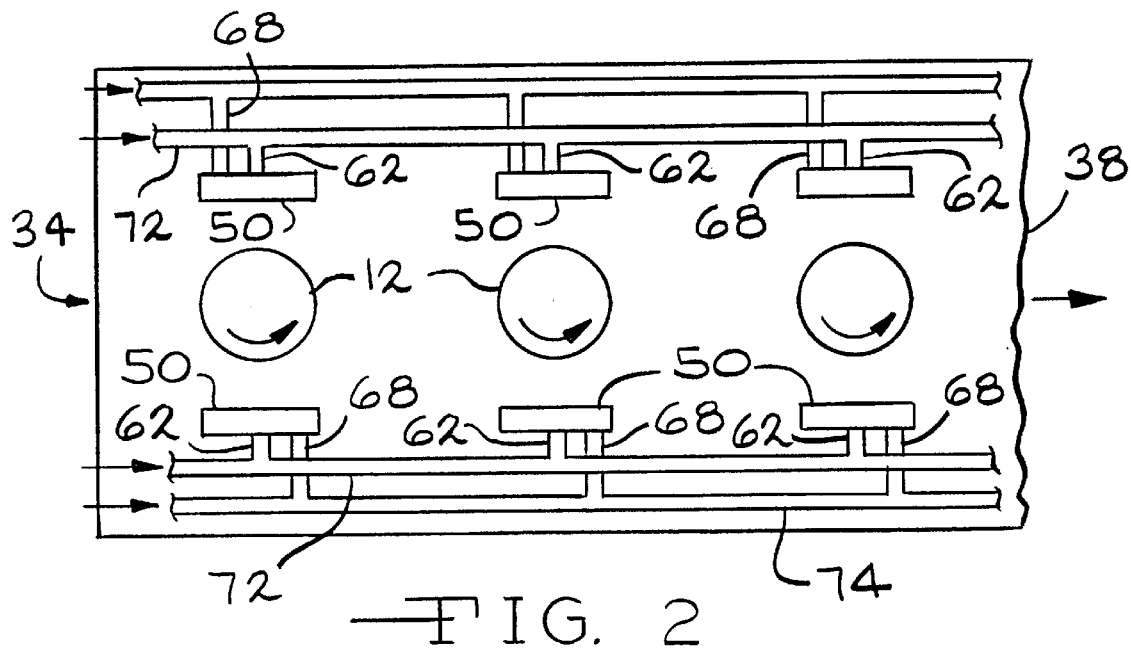
FIG. 2 is a plan view of the apparatus of FIG. 1 showing several fiberizers.

As shown in FIG. 2, a preferred arrangement of the apparatus for carrying out the method of the invention includes a plurality of fiberizers having a plurality of spinners 12 arranged along the length of a forming chain 38. Associated with each spinner 12 is a pair of polymer fiber dies 50. Each die 50 is supplied with molten polymer material by a polymer line 62, and the polymer lines are all fed by a polymer manifold 72. The polymer line is connected to the polymer extruder, not shown in FIG. 2.

The polymer dies 50 are also supplied with hot air by hot air lines 68, all of which are supplied by hot air manifolds 74. The hot air manifolds 74 are supplied from one or more hot air heaters 66 and polymer blowers 64, not shown in FIG. 2. The hot air aids in the attenuation of the polymer fibers by maintaining the polymer fibers in a soft, attenuable state during the attenuation process. If the polymer fibers were to cool too quickly after leaving the die 50, the polymer fibers would be too fat. The air supplied to the die is at a volume and pressure sufficient to result in up to nearly sonic air speeds.

It can be seen from FIG. 2 that by supplying polymer fibers 55 into contact with the glass fibers 22 from both sides of each of a plurality of spinners 12, there will be substantial integration of the two different types of fibers. Further, the polymer fibers 55 will preferably be uniformly intermixed with the glass fibers.

Figure 6:
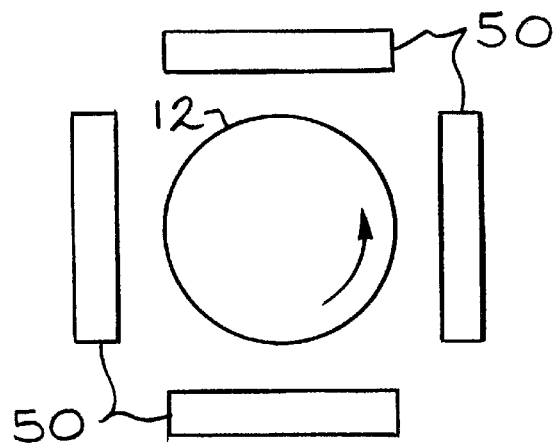
FIG. 6 is a schematic plan view similar to FIG. 2, illustrating four polymer fiber dies arranged around a single spinner.

More than two polymer dies 50 can be positioned around each glass fiber spinner 12. As illustrated in FIG. 6, four polymer fiber dies 50 are positioned circumferentially around the spinner. The polymer dies 50 could be configured in numerous other shapes to deliver polymer fibers 55 to the glass fiber veil 24 for entanglement with the glass fibers 22. Another possible configuration, not shown, is an annular or circular polymer fiber die surrounding the spinner.

Figure 4:
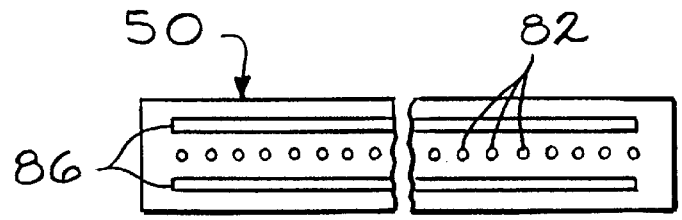
FIG. 4 is schematic bottom view of the polymer fiber die of FIG. 3, taken along line 4—4.

As shown in FIG. 4, the exit end or bottom 80 of the polymer spinner die 50 is provided with a plurality of polymer orifices 82 for the exit of molten polymer material. Positioned adjacent the row of polymer orifices are two air slot 84. The air slots emit pressurized air as gaseous flows or air jets that attenuate the polymer fibers 55 as the air jets move away from the die 50. The polymer orifices 82 can be of any size or cross-sectional shape suitable for the emission of the polymer material to form the polymer fibers 55.

The air slots 84 can be of any appropriate size for the emission of attenuation gases for the drawing out of the polymer fibers. The fibers 55 emanating from the die 50 are traveling in the array 52, in which the fibers are initially all traveling in directions substantially normal to the bottom 80 of the die 50, and in that respect they are in an aligned array. As the fibers 55 move further from the die 50, the paths of the fibers begin to diverge as the array begins to decay. The rate at which the array decays will depend on several factors, including the initial velocity of the polymer fibers, the volume of air flow with the array of fibers, the mass flow rate of the polymer material exiting the die, and the amount of air currents or turbulence surrounding the die. In a typical melt blown die 50 the parallel nature of the array of fibers decays substantially at a distance of about 30 to about 40 cm from the die. As a practical matter, as the polymer fibers 55 reach the veil 24 of glass fibers, the randomness of the paths of the polymer fibers increases. It is, however, beneficial for the polymer fibers to arrive at the glass fiber veil in a state of relative alignment in order to achieve successful insertion or integration of the polymer fibers into the glass fibers. Typically, the polymer fibers are still in an aligned array at a distance of about 20 cm from the die because a majority of the polymer fibers will still be substantially normal to the bottom 80 of the die 50.

Figure 5:
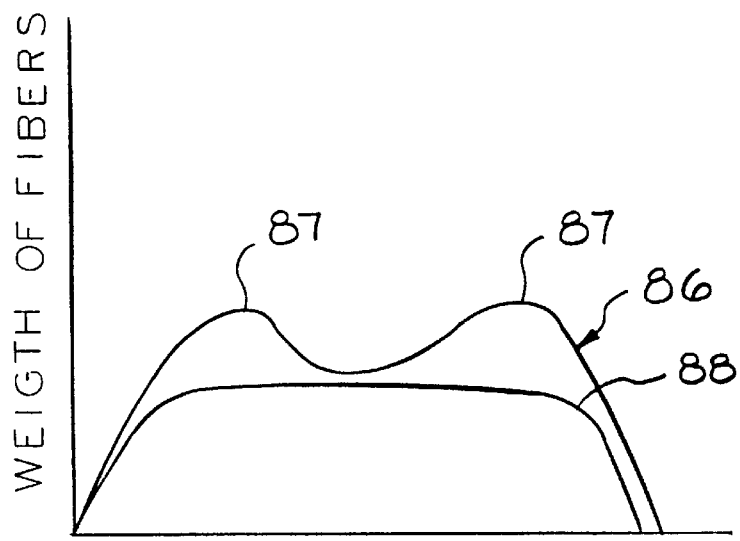
FIG. 5 is a graph illustrating the contrast between the weight distribution of polymer fibers from a rotary fiberizer and the weight distribution of polymer fibers from a melt blown polymer die.

One of the results of directing the polymer fibers in an aligned array from a polymer die having a linear array of orifices 85 is that the array of polymer fibers will exhibit a generally uniform weight distribution. As shown in FIG. 5, the weight distribution from a rotary fiberizer results in a double bell curve 86, having two peaks 87, when the fibers are collected using a wand passed through the veil of fibers created by the rotary fiberizer. On the other hand, the weight distribution of an array 85 of aligned fibers from the polymer die 50, having its orifices 82 in a linear array, is a substantially flat curve 88, when the fibers are collected by passing a wand through the array 85. Generally speaking, there are no peaks in the curve 88, and the weight distribution is generally uniform.

One of the characteristics of using a polymer die positioned externally of the glass fiber veil is that relatively long polymer fibers can be integrated with the mineral fibers to form the integrated pack. Typically the polymer fibers have an average length before heat setting of at least one meter, and possibly an average length of up to 3 meters or higher. The introduction of relatively long and strong polymer fibers into the predominantly glass fiber pack provides several significant advantages. The long polymer fibers can be used to help hold the pack together during further processing steps, such as, for example, a needling process. This will enable the production of insulation products without traditional binders. Second, the product with the long polymer fibers advantageously provides greatly increased mechanical and tensile strength, thereby allowing the insulation products to exhibit improved handleability. For example, binderless wall cavity insulation products, capable of being picked up and held by holding one end, can be made using the method of the invention. Finally, the polymer fibers are lighter than glass, and on a weight basis provide an increased surface area vis-a-vis glass fibers, thereby contributing to improved thermal and acoustical performance. Further, if a heat setting step is used, the long polymer fibers are potentially beneficial upon heating to create a network of polymer material sufficient to bond the glass fibers together into an insulation product. Such a product would have desirable product properties, such as sufficient tensile strength and product integrity to withstand the rigors of packaging, shipping and installation in the field.

Figure 7:
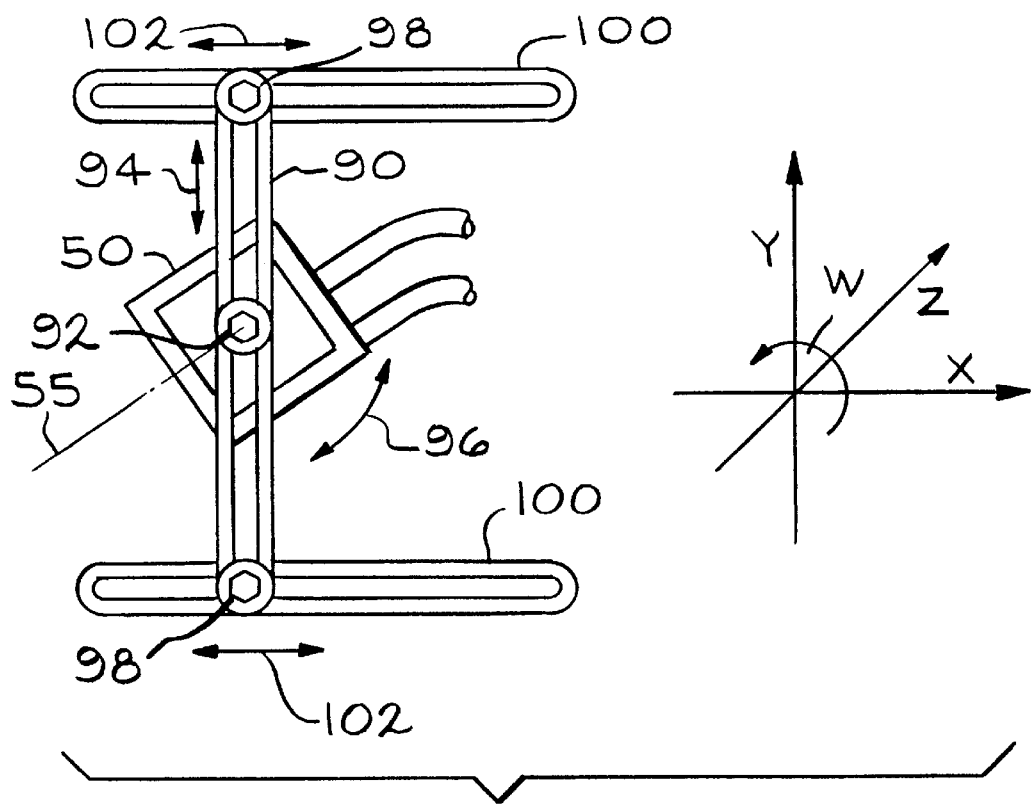
FIG. 7 is a schematic view of apparatus for adjusting the position and attitude of the polymer fiber die.

As shown in FIG. 7, the die 50 can be mounted for adjustability. The die is fastened to a slotted frame 90 by an adjustable bolt 92, which allows vertical movement (y-axis) as indicated by arrow 94, and which allows a pitch adjustment as indicated by arrow 96. Further, the slotted frame 90 can itself be moved horizontally by the action of bolts 98 positioned within horizontally oriented frames 100, as indicated by arrows 102 (x-axis). Also, the die can be moved along a z-axis as necessary by using a lengthy bolt 92 and spacers so that the relative position of the die 50 with respect to the slotted frame 90 along the z-axis (i.e., into and out of the paper when viewing FIG. 5) can be changed. This allows the position in the x, y, and z directions, and the orientation (pitch) indicated at w of the die to be rather easily changed. Other apparatus could also be used to provide the feature of adjustability. The height and angle at which the polymer fibers are introduced into the veil 24 is somewhat dependent on the melting characteristics of the polymer material used. Fibers from a higher melting polymer material can be introduced higher up in the veil than the fibers of a lower melting polymer material.

As shown in FIG. 3, the glass fiber veil 24 converges or necks down to a smaller diameter as the veil travels downwardly away from the spinner 12. More specifically, the glass fiber veil 24 has an initial diameter $D_i$ at an initial locus 106 at about the level of the blower, and the veil converges to a converged diameter $D_c$ narrower than the initial veil diameter $D_i$ at a converged locus 108 beneath the initial locus 106. Preferably, the polymer fibers 55 are directed into the veil so that a substantial portion (at least 75 percent), if not all, of the polymer fibers intersect the veil at the converged locus 108, or just slightly below it (i.e., beneath and within 50 cm of the converged locus).

In contrast with the coaxial fiber forming process disclosed in the abovementioned Bakhshi et al. patent, the polymer fiber forming is separated from the glass fiber forming, and therefore the polymer fibers can be kept further from the heat of the glass fiber forming process. This ensures that a much greater percentage of the polymer fibers will retain their fibrous nature in the integrated pack of polymer and glass fibers produced by the method of the invention. Preferably, at least a majority (i.e., greater than 50 percent) of the polymer material will remain in fibrous form. More preferably, a substantial amount (i.e., at least 75 percent) of the polymer material will be retained in fibrous form.

It is to be understood that the polymer fibers 55 must have sufficient momentum in the horizontal direction in order to successfully intermingle with the glass fibers 22 before the glass fibers are collected. Otherwise there will not be integration of the polymer fibers with the glass fibers, and all or substantially all of the polymer material will end up outside or on the top side of the collected fibrous product. A balance must be maintained to assure that the polymer fibers are aimed high enough into the glass fiber veil 24 for good penetration, and yet not so high that the polymer fibers encounter heat sufficient to melt too many of the fibers. It is important to retain a majority of the organic material in fibrous form. Ideally, substantially all of the polymer material will remain in fibrous form. Therefore, successful operation of the process will require that the polymer fibers operate within a relatively narrow time, temperature and momentum window.

As shown in FIG. 8, the method of the invention can be carried out using a direct formed fiber collection system. As shown, the spinner 12 produces a veil 24 of glass fibers. Polymer fiber dies 50 produce arrays of polymer fibers, and direct the polymer fibers into contact with the glass fibers to integrate the polymer fibers with the glass fibers. Direct forming conveyors 118, such as those disclosed in published PCT Application No. WO 95/30787, which is hereby incorporated by reference, are foraminous, and are provided with an air evacuation apparatus to assist in removing air from the integrated glass and polymer fibers. The integrated glass fibers and polymer fibers are gathered by the converging direct forming conveyors 118 and collected on a conveyor 120 as a direct formed pack 122.

The direct formed pack can be taken through a product shaping oven 124 where hot gases at temperatures within the range of from about 175° C. to about 250° C., and preferably at a temperature of about 204° C., are blown through the pack to slightly soften the polymer fibers 55 so that they bond to the glass fibers to form an insulation product having good pack integrity. Preferably, the pack 122 is under vertical compression during the product shaping process so that the product thickness is defined. Care must be taken not to heat the polymer fibers to such an extent that a majority of the polymer fibers melt or otherwise lose their fibrous form. It is important to retain a majority of the organic material in fibrous form. Immediately following the oven 124 is the cooling section 125 where the fibrous product is cooled while still held in vertical compression.

It can be appreciated that the energy and environmental requirements for product shaping in accordance with the method of the invention are substantially different from the heating and environmental requirements of conventional process for making conventional mineral fiber insulation products containing organic binder. The application of conventional binder is applied as an aqueous solution and requires extensive cleanup of manufacturing equipment. The binder must be cured by transporting the pack through a convection oven, typically 100 feet long or longer. Hot air at temperatures of about 232° C. is forced through the pack, sometimes at velocities sufficient to degrade the ultimate insulation product properties. A majority of the energy introduced into the oven is used to dry water from the wet binder, before the binder can be heated to a temperature sufficient to cure the binder. A portion of the binder material will not remain on the insulation pack, and will become an undesirable effluent material, which must be incinerated in a separate oven. In contrast, the process of the invention does not introduce a wet binder to glass fibers. The heat setting oven requires only heat sufficient to soften and bond the polymer fibers to the glass fibers. There is no effluent to be cleaned up. The oven can be substantially shorter than conventional ovens. It is contemplated that the heating setting step of the invention could be carried out in a direct formed process using the heat of the fiber forming process for a substantial portion of the needed for the heat setting process. Also, it is contemplated that the heat setting could be accomplished using a heated shoe or product die, using no convection air.

After the pack passes through the product shaping oven 124 and cooling section 125, the fibrous product can optionally be passed through encapsulation equipment 126 which takes encapsulation material, such as a thin film of polyethylene material, from a roll 128 and applies the film to the pack 122. Subsequently, the pack can be cut into lengths by the chopper 130 to form encapsulated batts 132.

EXAMPLE I

A fiberizer for glass fibers was operated using standard wool glass with a throughput of 750 pounds per hour (341 kg/hr). The spinner was 15 inches in diameter (38 cm) and had 15,000 orifices to produce fibers having a diameter of about 7 microns. The spinner was operated at a speed of 2500 revolutions per minute. A polymer die was positioned to direct 5 micron polypropylene fibers from 38 melt flow polypropylene into the converged locus of the glass fiber veil. The die had a row of polymer orifices with an orifice density of 30 orifices per inch (about 12 orifices per cm) and a total length of about 12 inches (30.5 cm). The die had a throughput of about 25 pounds per hour (11.4 kg/hr). On either side of the row of polymer orifices was an air slot. The polymer openings had a diameter of about 20 mil (0.51 mm). The die was positioned at a 25 degree angle to the horizontal, positioned about 20 cm from the veil of glass fibers, and located about 50 cm below the spinner. The calculated polymer fiber speed at a distance 20 cm from the die was 150 meters per second. No organic binder was added, but an organic lubricant was sprayed onto the glass fibers in the veil, resulting in a lubricant content of about 0.1 percent by weight of the final product. Nearly all of the polymer fibers were collected.

The intermingled glass fibers and polymer fibers were collected in a direct formed process as a fibrous pack. An encapsulation step was used as a processing aid. A visual examination of the fibrous pack indicated that the polymer fibers were generally distributed throughout the pack, although not completely uniformly. About 80 percent of the polymer material was in the form of fibers, with about 20 percent of the polymer material in a remelted form. This was determined using a photo microscope. It is believed that the uniformity of polymer fiber distribution and the amount of polymer material remaining in fibrous form can be further improved through further experimentation with the variables above.

EXAMPLE II

The fibrous pack of intermingled glass fibers and polymer fibers of Example I, with the encapsulation material removed, was cut to a 15.5 inch by 4 ft. batt (39.4 cm by 122 cm) and placed in an oven under compression to a 1 inch thickness (2.54 cm) at 204° C. for 45 minutes to bond the polymer fibers to the glass fibers, and thereby to subject the fibrous insulation to product shaping. The batt was held in compression for 45 minutes further during cooling. It should be understood that the total time of compression, i.e., one and one-half hours, was much longer than would be expected in a commercial manufacturing line, and was for experimental purposes only. The resulting insulation product had a loss on ignition (LOI) of about 2.5 percent, of which approximately 0.1 was the lubricant. The batt had a good level of integrity down most of its length, with pack integrity being the ability of the fibers to stay together during handling. The product was able to be successfully installed in a wall cavity, without the benefit of any binder or encapsulation.

EXAMPLE III

The fibrous pack of intermingled glass fibers and polymer fibers of Example I was cut into a sample 12 inches by 12 inches by 3½ inches thick (30.5 cm by 30.5 cm by 8.9 cm thick) for testing. The density of the sample was 0.7 pounds per ft$^3$ (11.2 kg/m$^3$). The average glass fiber diameter was 7 microns. The average polymer fiber diameter was 5 microns. The sample was tested using ASTM test method C-518 and a guarded hot box to determine thermal conductivity. The results indicate that the sample had an improvement (decrease) in k value of nearly twenty k points compared to an all-glass fiber product having the same density and fiber diameter (to about 0.303 from about 0.32 BTU-In/(Hr.Ft$^2$-° F.) at a density of about 0.6 pcf (9.6 kg/m$^3$)). Subsequent burnoff of the polymer fibers showed that the polymer fibers constituted about 2.5 percent by weight of the sample.

EXAMPLE IV

The process of Example I was repeated without the benefit of the sprayed on lubricant. Without the lubricant, it was not possible to have the polymer fibers successfully penetrate the glass fiber veil, and the collected fibrous material consisted of a glass wool pack with a layer of polymer fibers forming a network or web on the top of the pack. The web of polymer fibers was bonded to the glass wool pack.

Figure 9:
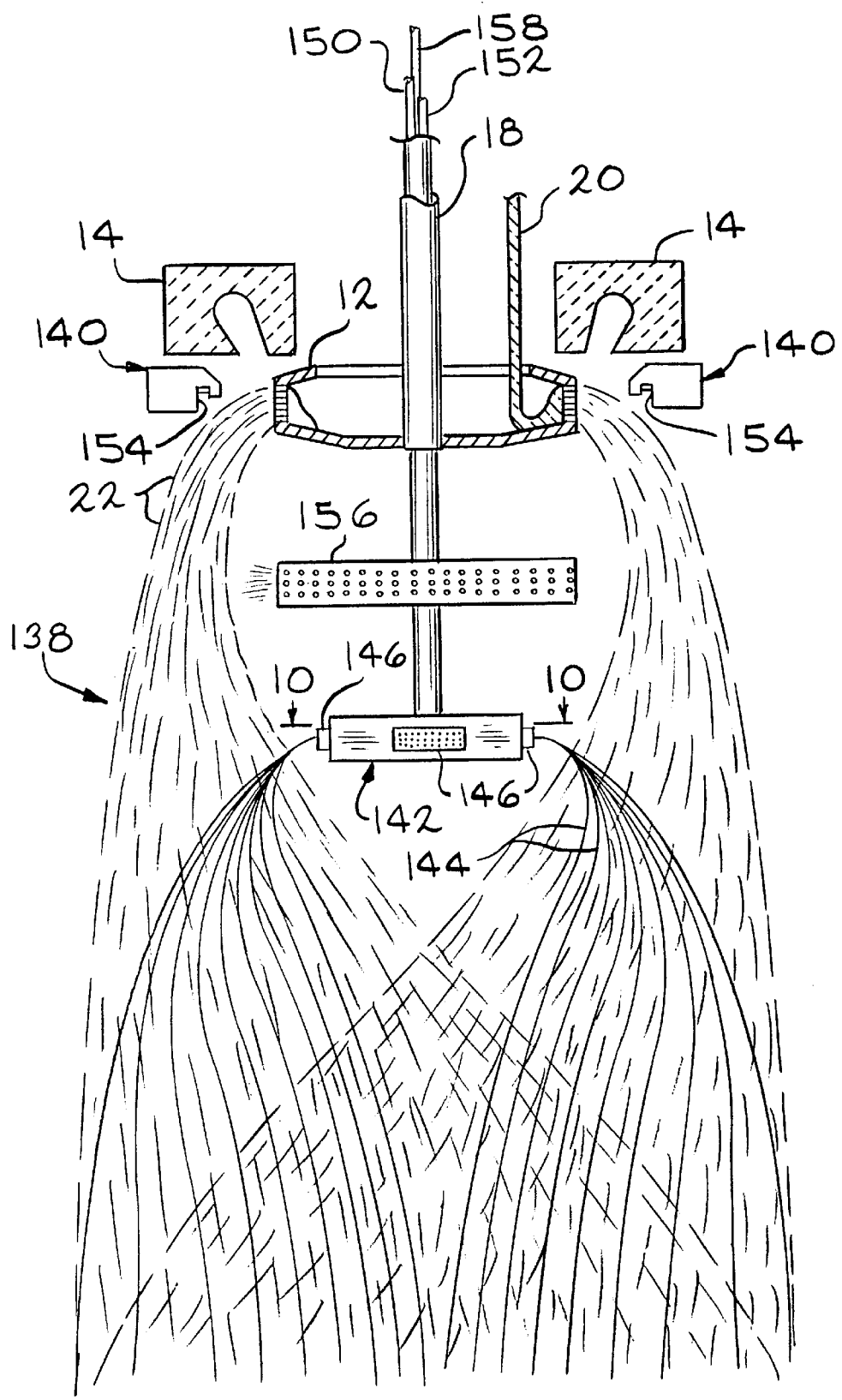
FIG. 9 is a schematic view in elevation of apparatus for integrating polymer fibers with glass fibers according to an alternate embodiment of the invention.
Figure 10:
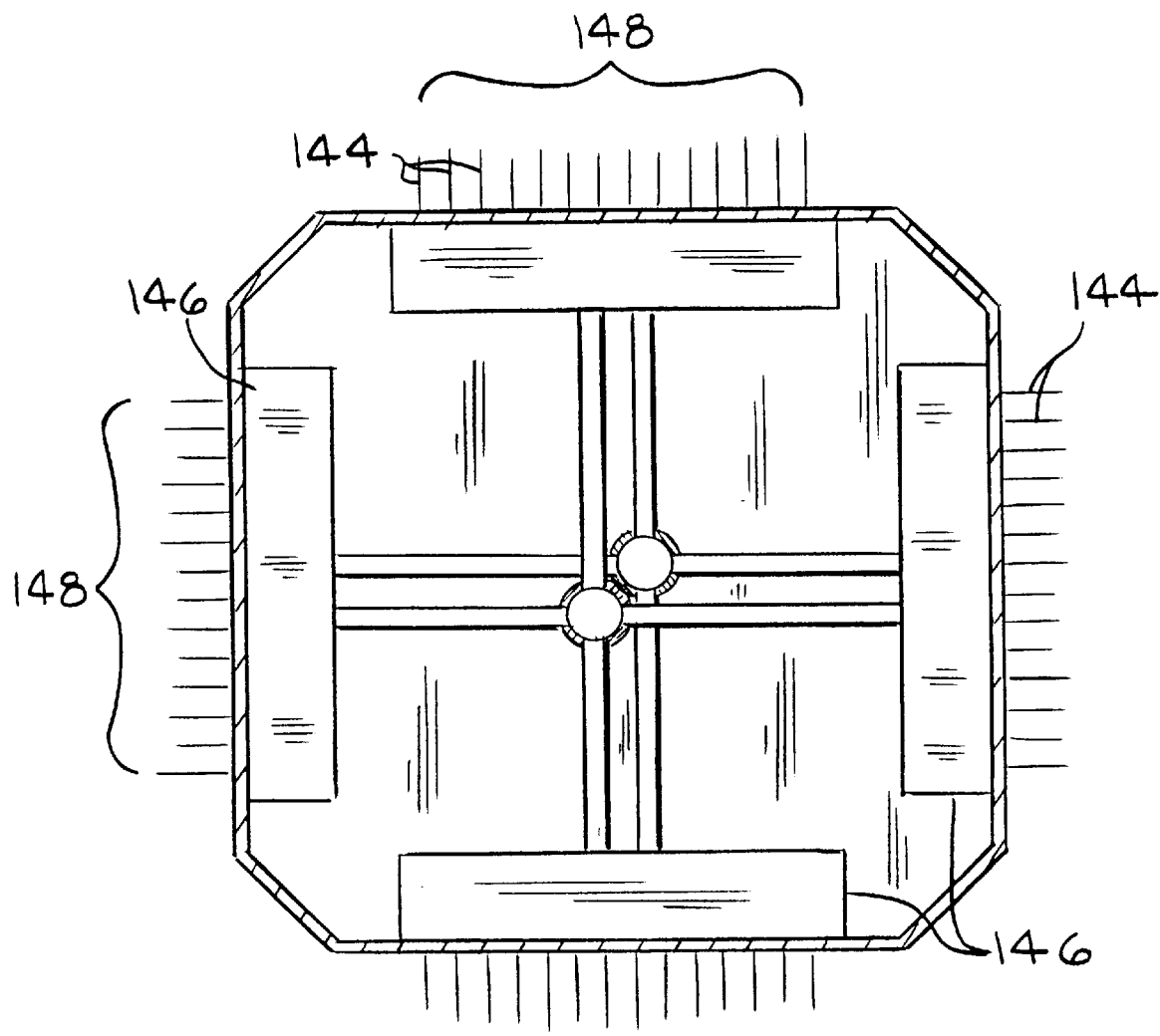
FIG. 10 is a plan view of the stationary polymer die of FIG. 9, taken along line 10—10.
Figure 1:
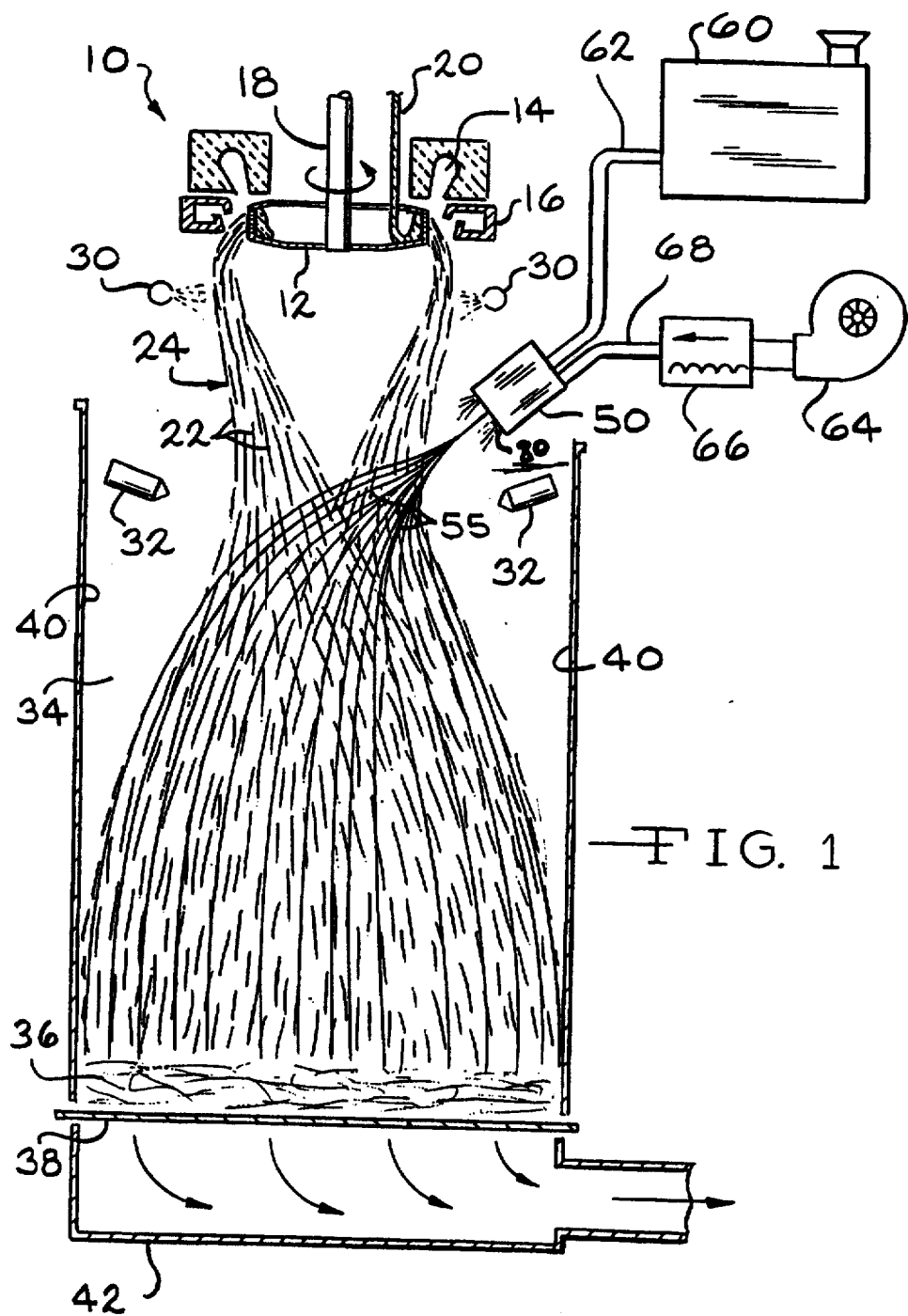
Figure 3:
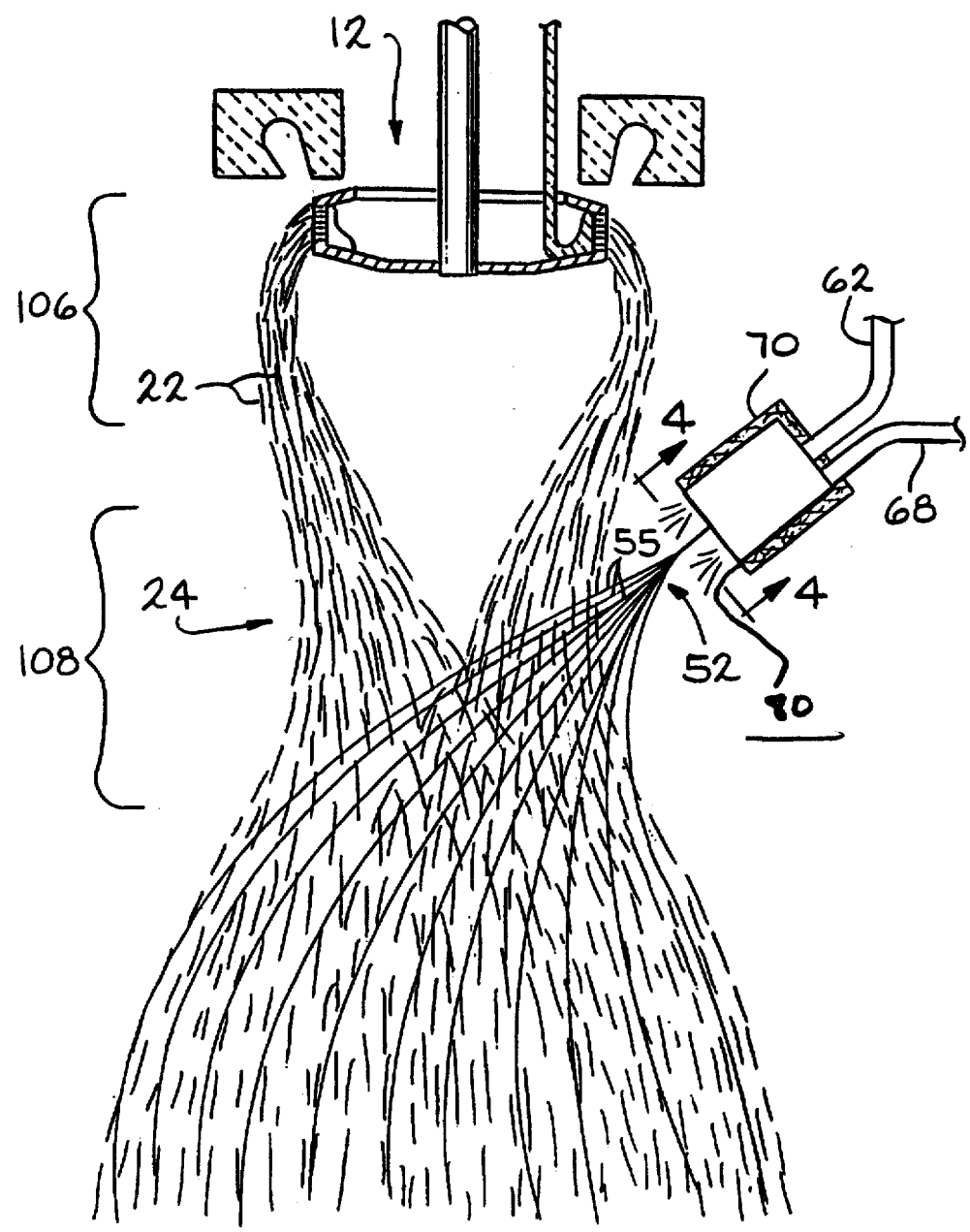
Figure 4:
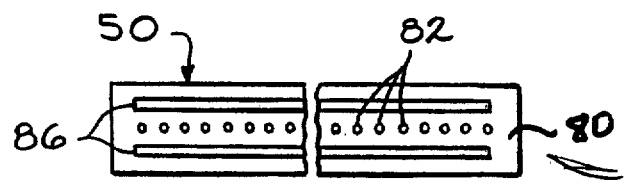
Figure 5:
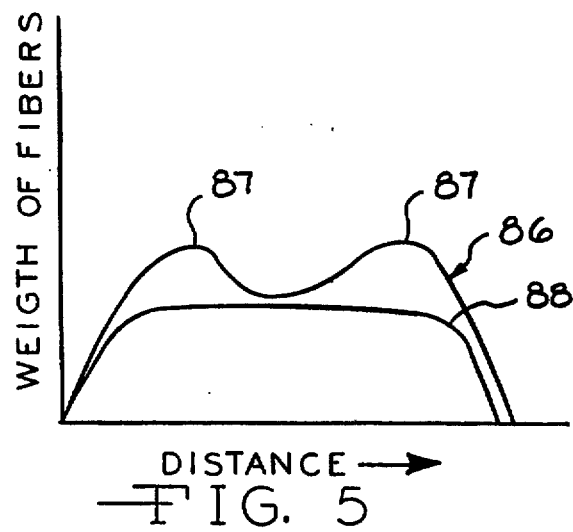
Figure 6:
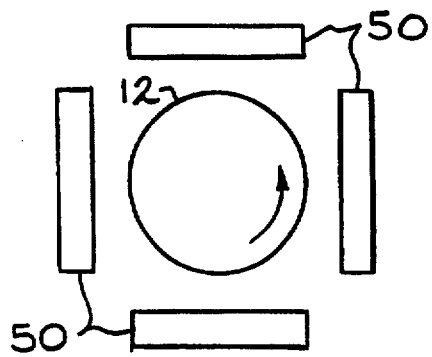

In yet another embodiment of the invention the array of aligned organic fibers is produced by a stationary polymer fiber die positioned within the veil of mineral fibers, and the array of organic fibers is directed into contact with the mineral fibers to integrate the organic fibers with the mineral fibers. As shown in FIG. 9, the glass fiber spinner 12 is rotated by quill 18 and the glass fibers 22 emanating from the spinner form a veil 138. The glass fibers are attenuated by an annular blower 140. Positioned beneath the spinner 12 and within the veil 138 is a stationary polymer fiber die 142. Preferably the polymer fiber die produces one or more arrays of aligned polymer fibers 144 using a melt blowing process as described above. As shown more clearly in FIG. 10, the polymer fiber die 142 can be configured with four die faces 146 to produce four arrays 148 of polymer fibers 144. The die 142 can be supplied with molten polymer material from an extruder or similar device, not shown, via stationary polymer line 150. Likewise, heated air for attenuation of the polymer fibers can be supplied from an appropriate source, not shown, via stationary hot air line 152. The stationary polymer line 150 and the stationary hot air line 150 are positioned within the hollow rotating quill 18. Preferably the polymer die 142 is positioned well below the spinner 12 so that the polymer material will remain as fibers and will not be degraded or vaporized.

In order to be sure that the glass fiber veil 138 does not collapse inwardly and thereby impinge on, or otherwise contact the polymer die 142, it is advantageous to configure the blower 140 as a faceless blower. The blower 140 does not produce a blower jet having the radially inward directional component common to most mineral fiberizer blowers, and therefor produces a more expanded veil 138 than would otherwise be the case. The blower 140 is referred to as a faceless blower because of the short radially inwardly facing edge 154. Also, a lower, secondary blower, such as internal blower 156, is also be used to expand the veil 138, and thus keep the veil from collapsing or necking. This blower configuration allows the die 142 to be positioned much lower below the spinner 12 than, for example, the polymer fiber spinner of the above-mentioned U.S. Pat. No. 5,490,961 to Bakhshi et al., allowing much greater retention of polymeric material in fibrous form.

In an additional embodiment, surface layers of polymer fibers on fibrous products could be subjected to a heating process to convert the layer of polymer fibers into a bonded polymeric network for advantageous product qualities. Such a surface layer would make the resulting insulation product stronger and more amenable to handling without damage. Also, the fibrous pack could be subjected to a molding process in which either the whole fibrous pack or the surfaces of the pack could be molded under heat and pressure to form various insulation or structural products.

It can be seen by the above discussion that the introduction of relatively long and strong polymer fibers into the relatively short glass fibers can be used to effect different product attributes in insulation products produced according to the method of the invention. The capability and flexibility of the method of the invention will enable the manufacture of improved products, having better weight distribution and better fiber distribution without the need for auxiliary distribution or lapping devices for the polymer fibers. Further, because of the decoupling of the polymer fiber forming process from the glass fiber forming process, there is an improved control of the nature of the polymer fiber/glass fiber interface, including the degree of entanglement between the polymer fibers and the glass fibers, and improved retention of polymer material in fibrous form. Prior to any heat setting step, the pack has improved handling and processing properties, and is therefore suitable for such fabrication techniques as needling. Further, if the fibrous pack is subjected to a heat setting step, the heat setting oven can be set to soften the polymer fibers to an extent sufficient to bond the polymer fibers to the glass fibers without causing the polymer fibers to lose their fibrous nature. Such a heat setting step would produce an insulation product with substantially less energy and environment cleanup costs when compared with conventional bindered insulation products.

The principle and mode of operation of this invention have been described in its preferred embodiment. However, it should be noted that this invention may be practiced otherwise than as specifically illustrated and described without departing from the scope of the invention.

What is claimed is:

1. A method of forming an integrated pack of organic and mineral fibers comprising:

centrifuging mineral fibers from molten mineral material using a mineral fiber spinner;

directing the mineral fibers into a downwardly moving veil;

generating from a stationary melt blowing die an array of aligned organic fibers traveling in a direction substantially normal to the exit end of the die and directing the organic fibers into contact with the mineral fibers to integrate the organic fibers with the mineral fibers; and collecting the integrated mineral fibers and organic fibers as a fibrous pack.

2. The method of claim 1 in which said generating and directing step includes disbursing molten organic material through the orifices of an orificed die, and attenuating the organic material with gaseous flows moving away from the die.

3. The method of claim 2 in which the velocity of the organic fibers in the array is at least 50 meters/second at a distance of 20 cm downstream from the die.

4. The method of claim 2 in which the velocity of the organic fibers in the array is at least 100 meters/second at a distance of 20 cm downstream from the die.

5. The method of claim 1 wherein said generating and directing step includes generating a plurality of arrays of aligned organic fibers from dies, and directing each of the arrays into contact with the mineral fibers, wherein each array of aligned organic fibers is generated by disbursing molten organic material through the orifices of an orificed die, and by attenuating the organic material with gaseous flows moving away from the die.

6. The method of claim 1 in which the step of directing the mineral fibers includes blowing air from an annular blower around the mineral fibers to form a veil of mineral fibers having an initial diameter at an initial locus at about the height of the blower, and having a converged diameter narrower than the initial diameter at a converged locus beneath the initial locus, and wherein the organic fibers are directed into the veil so that a substantial portion of the organic fibers intersect the veil at said converged locus or beneath and within 50 cm of said converged locus.

7. The method of claim 1 wherein said generating and directing step includes generating organic fibers having an average diameter of from about 4 to about 25 microns.

8. The method of claim 1 including heating the fibrous pack to soften the organic fibers to an extent sufficient to bond the organic fibers to the mineral fibers while retaining a majority of the organic material in fibrous form.

9. The method of claim 8 wherein said heating step is carried out in a manner sufficient to retain a substantial amount of the organic material in fibrous form.

10. The method of claim 8 in which the heating step is carried out while the fibrous pack is under compression, and wherein the method further includes cooling the pack while said compression of the fibrous pack is maintained.

11. The method of claim 1 wherein said generating and directing step includes at least one array of aligned organic fibers from a stationary organic fiber die positioned within the veil of mineral fibers, and wherein the method further includes blowing gas from a position within the veil above said die to expand the veil.

12. The process of claim 1, wherein said organic fibers are polypropylene fibers, and a portion of said polypropylene fibers comprises polypropylene grafted with a polar monomer selected from the group consisting of maleic anhydride, acrylic or methacrylic acid, and esters thereof.

13. The process of claim 12, wherein said polar monomer is present in said grafted polypropylene in an amount of from about 0.1% to about 10.0% by weight.

14. The process of claim 12, wherein said polypropylene fibers comprise from about 5% to about 30% of maleic anhydride grafted polypropylene.

15. A method of forming an integrated pack of organic and mineral fibers comprising:

centrifuging mineral fibers from molten mineral material using a mineral fiber spinner;

directing the mineral fibers into a downwardly moving veil by means of an annular blower, wherein the veil of mineral fibers has an initial diameter at an initial locus at about the height of the blower, and a converged diameter narrower than the initial diameter at a converged locus beneath the initial locus;

generating from stationary melt blowing die an array of aligned organic fibers traveling in a direction substantially normal to the exit end of the die and directing the organic fibers into contact with the mineral fibers to integrate the organic fibers with the mineral fibers by disbursing molten organic material through the orifices of the die and attenuating the organic material with gaseous flows moving away from the die, wherein the organic fibers are directed into the veil so that a substantial portion of the organic fibers intersect the veil at a locus which is at the converged locus or beneath and within 50 cm of the converged locus; and collecting the integrated mineral fibers and organic fibers as a fibrous pack.

16. The method of claim 15 in which the velocity of the organic fibers in the array is at least 100 meters/second at a distance of 20 cm downstream from the die.

17. The method of claim 16, further including the steps of heating the fibrous pack, while the fibrous pack is under compression, to soften the organic fibers to an extent sufficient to bond the organic fibers to the mineral fibers while retaining a majority of the organic material in fibrous form, and then cooling the fibrous pack while maintaining compression of the fibrous pack.

18. The method of claim 17 wherein said heating step is carried out in a manner sufficient to retain a substantial amount of the organic material in fibrous form.

19. A method of forming an integrated pack of organic and mineral fibers comprising:

centrifuging mineral fibers from molten mineral material using a mineral fiber spinner;

directing the mineral fibers into a downwardly moving veil;

generating an array of aligned organic fibers from a stationary melt blowing having an average length of at least one meter from a die and directing the organic fibers into contact with the mineral fibers to integrate the organic fibers with the mineral fibers; and collecting the integrated mineral fibers and organic fibers as a fibrous pack.

20. The method of claim 19 wherein said heating step is carried out in a manner sufficient to retain a substantial amount of the organic material in fibrous form.

* * * * *

UNITED STATES PATENT AND TRADEMARK OFFICE
CERTIFICATE OF CORRECTION

PATENT NO. : 5,876,529
DATED : March 2, 1999
INVENTOR(S) : Larry J. Grant, Michael T. Pellegrin, Jay W. Hinze and Quingyu Zeng It is certified that error appears in the above-identified patent and that said Letters Patent is hereby corrected as shown below:

Drawings,
Please delete Figs. 1, 3 and 4, and substitute the corrected formal drawing sheets 1, 3 and 4, with the addition of No. 80 in Figs. 1, 3 and 4, as shown on the attached pages.

Signed and Sealed this

Sixteenth Day of April, 2002

Attest:

Attesting Officer

JAMES E. ROGAN
Director of the United States Patent and Trademark Office